(12) United States Patent
Rowse et al.

(10) Patent No.: US 8,564,408 B2
(45) Date of Patent: Oct. 22, 2013

(54) ELECTRONIC NEAR FIELD COMMUNICATION ENABLED MULTIFUNCTIONAL DEVICE AND METHOD OF ITS OPERATION

(75) Inventors: Graham Rowse, Hampshire (GB); Joe Pendlebury, Hampshire (GB)

(73) Assignee: Nokia Corporation, Espoo (FI)

( * ) Notice: Subject to any disclaimer, the term of this patent is extended or adjusted under 35 U.S.C. 154(b) by 1297 days.

(21) Appl. No.: 12/082,413

(22) Filed: Apr. 9, 2008

(65) Prior Publication Data

US 2010/0026454 A1 Feb. 4, 2010

Related U.S. Application Data

(63) Continuation of application No. 10/937,084, filed on Sep. 8, 2004, now Pat. No. 7,375,616.

(51) Int. Cl.
*H04Q 5/22* (2006.01)
*G08B 13/14* (2006.01)
*G08B 26/00* (2006.01)

(52) U.S. Cl.
USPC ..... 340/10.1; 340/10.4; 340/10.5; 340/572.2; 340/505

(58) Field of Classification Search
USPC ......... 340/10.1, 10.4, 10.41, 572.2, 505, 551; 455/127, 38.3; 70/70
See application file for complete search history.

(56) References Cited

U.S. PATENT DOCUMENTS

| | | | |
|---|---|---|---|
| 4,924,210 A | 5/1990 | Matsui et al. | 340/10.41 |
| 5,778,309 A | 7/1998 | Tuttle et al. | 340/10.34 |
| 6,172,596 B1 | 1/2001 | Cesar et al. | 340/10.41 |
| 6,172,609 B1 | 1/2001 | Lu et al. | 340/10.4 |
| 6,566,997 B1 | 5/2003 | Bradin | 340/10.2 |
| 6,577,229 B1 | 6/2003 | Bonneau et al. | 340/10.41 |
| 6,812,824 B1 | 11/2004 | Goldinger et al. | |

(Continued)

FOREIGN PATENT DOCUMENTS

| | | |
|---|---|---|
| EP | 1431904 | 6/2004 |
| JP | 06112876 | 4/1994 |

(Continued)

OTHER PUBLICATIONS

Patent Abstracts of Japan, Publication No. 2004200840, published Jul. 15, 2004, 1 page English Abstract, Sony Corp, "Communication Apparatus and Communication Method," Fujii et al.

(Continued)

*Primary Examiner* — Nam V Nguyen
(74) *Attorney, Agent, or Firm* — Locke Lord LLP (57) ABSTRACT

A computer program stored in a memory unit of an electronic near field communication (NFC) module for near field communication devices in environments with different data formats according to different protocols is able to carry out a first initiation operation using a first data format according to a protocol of a first standard, a second initiation operation using a second data format according to a protocol of a second standard, a delay operation, and is able to repeat these operations in a repetitive process. Such devices can search their environment periodically for available RFID tags, RFID readers, NFC multifunctional devices, or the like. The delay can be fixed, variable in length, or both fixed and variable delays can be used. The invention enables for instance a mobile phone to act as an RFID reader of multiple tag formats, to emulate a tag, or to communicate with other NFC devices.

50 Claims, 5 Drawing Sheets

(56) References Cited

U.S. PATENT DOCUMENTS

| | | | |
|---|---|---|---|
| 7,075,412 B1 | 7/2006 | Reynolds et al. | 340/10.2 |
| 7,209,706 B2 | 4/2007 | Fujii et al. | |
| 7,375,616 B2 * | 5/2008 | Rowse et al. | 340/10.1 |
| 7,548,153 B2 * | 6/2009 | Gravelle et al. | 340/10.3 |
| 2003/0137403 A1 | 7/2003 | Carrender et al. | 340/10.4 |
| 2004/0077383 A1 | 4/2004 | Lappetelainen et al. | 455/574 |
| 2004/0116074 A1 | 6/2004 | Fujii et al. | |
| 2004/0140884 A1 | 7/2004 | Gallagher, III et al. | 340/10.2 |

FOREIGN PATENT DOCUMENTS

| | | |
|---|---|---|
| JP | 2000175235 | 8/2000 |
| JP | 2001283162 | 10/2001 |
| JP | 2003022422 | 1/2003 |
| JP | 2003249870 | 9/2003 |
| JP | 2004200840 | 7/2004 |
| WO | 98/16849 | 4/1998 |
| WO | 01/50407 | 7/2001 |
| WO | WO 01/50407 A1 | 7/2001 |
| WO | WO0150407 | 7/2001 |
| WO | WO 03/081787 A2 | 10/2003 |
| WO | WO03081787 | 10/2003 |

OTHER PUBLICATIONS

Patent Abstracts of Japan, Publication No. 2003022422, published Jan. 24, 2003, 1 page English Abstract, Nippon Signal Co, LTD, "Reader-Writer for Noncontact IC Card," Matsukawa.

Patent Abstracts of Japan, Publication No. 2001283162, published Oct. 12, 2001, 1 page English Abstract, Dainippon Printing Co, LTD, "Non-contact IC Card Reader/Writer." Nishikawa et al.

Japanese Office Action dated Mar. 11, 2011 in parallel Japanese Patent Application No. 2010-015487 (5 pages) and an English translation thereof (8 pages) (13 pages total).

Patent Abstracts of Japan, Japanese Unexamined Patent Publication No. 2003-022422, Matsukawa Koichi, published Jan. 24, 2003 (1 page).

Patent Abstracts of Japan, Japanese Unexamined Patent Publication No. 2001-283162, Nishikawa Seiichi et al., published Oct. 12, 2001 (1 page).

Patent Abstracts of Japan, Japanese Unexamined Patent Publication No. 2000-175235, Ichiyama Yoshikazu, published Aug. 23, 2000 (1 page).

Patent Abstracts of Japan, Japanese Unexamined Patent Publication No. 06-112876, Mochizuki Hiroki, published Apr. 22, 1994 (1 page).

English Abstract of Japanese Unexamined Patent Publication No. 2004-200840, Kunihide Fujii et al., published Jul. 15, 2004 (1 page).

MIFARE, Standard 4 kByte Card IC, MF1 1C S70, Functional Specification, Philips Semiconductors, Product Specification Rev. 3.1 Oct. 2002, 17 pages.

ISO/IEC FDIS 14443-4:2000(E), Identification cards—Contactless integrated circuit(s) cards—Proximity cards—Part 4: Transmission protocol, Jul. 13, 2000, 44 pages.

ECMA-352 Standard, Near Field Communication Interface and Protocol-2 (NFCIP-2), Dec. 2003, 8 pages.

"Computer" Dictionary.com Unabridged (v. 1.1) Random House, Inc., Dec. 29, 2006. <Dictionary.com http://dictionary.reference.com/browse/computer>.

Korean Office Action mailed Jan. 24, 2011 in corresponding Korean Patent Application No. 10-2009-7001937 (2 pages plus 2 pages of English translation (4 pages total)).

* cited by examiner

ELECTRONIC NEAR FIELD COMMUNICATION ENABLED MULTIFUNCTIONAL DEVICE AND METHOD OF ITS OPERATION

CROSS-REFERENCE TO RELATED APPLICATIONS

This application is a continuation of U.S. patent application Ser. No. 10/937,084, filed on Sep. 8, 2004, now U.S. Pat. No. 7,375,616, issued May. 20, 2008. The aforementioned patent application is hereby incorporated by reference in its entirety.

FIELD OF THE INVENTION

The present invention relates to short-range Near Field Communication (NFC) systems. The present invention also relates to the exchange of digital data between mobile devices. More particularly the present invention relates to improvements in RF (radio frequency)-tagging communication systems, wherein the present invention provides means in a mobile multifunctional device to indirectly and internally utilize RF module information stored in connection with the RF module of the multifunctional device to enhance the operation of the multifunctional device. This invention also relates to the way the user interface can be simplified and assist the user in the automated resolution of interactions.

BACKGROUND OF THE INVENTION

In the following the expression, "multifunctional device" is used to refer to an RFID (radio frequency identification) device that is capable of operating as an RFID reader, is further capable of emulating an RFID tag, and can further be used for exchanging data with another RFID "multifunctional device" similar to the data transmission between an RFID tag and an RFID reader.

The data exchange between different multifunctional devices entails that it is not possible to determine the actually used functionality of a device. In the following the expression "initiator" will be used to refer to a device sending a signal for initiating near field communication. In the conventional RFID architecture the initiator is always the RFID reader requesting data. In the case of multifunctional devices the initiator can request to receive data or can request to dispatch a data transmission.

In the following the expression "target" will be used to refer to a device an initiator sends an initiation signal to. Actually there can be two different kinds of targets: active and passive targets. In the conventional RFID-reader/tag architecture there are only passive targets, i.e. RFID tags always providing the initial data transmission.

In the multifunctional device architecture the multifunctional device can be in the role of an active target or can be in the role of a passive target. In case the passive target role is adopted, the multifunctional device emulates a conventional RFID tag. In case the active target role is adopted, the multifunctional device can actively exchange data by using its own local power. The data exchange is not limited by a tag size when communication is performed between multifunctional devices, or multifunctional devices and other NFC devices or infrastructures. In the active target role, the multifunctional device can also request information or data.

Presently RF-tagging technologies, such as for example the RFID technology employ inductive or capacitive coupling in the radio frequency (RF) portion of the electromagnetic spectrum. RFID readers include at least an antenna, a receiver and a transmitter, where a RF signal may be transmitted and received by the RFID reader. A RF signal activates transponders or "tags" when brought in contact with or when brought within a predetermined local range of the tags. When a tag has been activated it transmits information back to the RFID reader. More particularly, in the case of a passive tag (i.e. having no local power source), the tag may be energized by a time-varying electromagnetic RF wave generated by the RFID reader. When the RF field passes through the antenna coil associated with the tag, a voltage is generated across the coil. This voltage is ultimately used to power the tag, and makes it possible that the tags return transmissions of information to the reader, sometimes referred to as "coupling".

Actually there are different near field communication standards available on the market, such as e.g. ISO144434, Mifare, FeliCa, NFC and ECMA352.

A document related to the technological background of RFID tags is U.S. Patent Application Publication No. 20040077383A1, disclosing the technology of an enhanced RFID tag.

In case of the standard application of RFID technology a proprietary RFID reader is located in an environment with only a single type of RFID tag. With standard applications it is not necessary for a device to deal with different kinds of RFID tags in a single environment. For example in a stockroom or a supermarket there is no reason to use different types of RFID tags of different manufacturers that can consequently only be read by different readers. The use of different tags increases the expense of providing different kinds of readers and additionally may cause compatibility problems.

Several polling schemes have been used in the past, but none is fully suitable for use with RFID interactions between mobile devices.

The RFID technology can now be extended to a NFC (near field communication) implementation in mobile multifunctional devices enabling them to have interactions with tags, readers and with each other. The interaction between each other results from the ability to read out RFID tags i.e. the ability to send RF signals and the possibility to process returned RF signals. The expense necessary to implement the ability to emulate an RFID tag into an RFID reader is very small, as signal processing capabilities, a transmitter and a receiver are already provided. In a conventional initiation process "cardwarming signals" are usually employed to wake up transponder devices or to power up RFID tags that are not provided with a built-in power supply. This capability can be used to transfer different data from one mobile tag-reader (emulating a tag) to a standard reader.

Interest in and use of various RF-tagging technologies has recently grown significantly, resulting in the development of various RF-tagging applications outside the conventional manufacturing line and electronic article surveillance applications. RF-tagging technologies are predicted to become one of the leading technologies providing short-range interaction applications in the near future, especially in a mobile communication environment.

All the conventional approaches for detecting RFID tags above have in common that they are not suitable for use with mobile multifunctional devices such as mobile phones or handheld computers. This is caused by the fact that on the one hand RFID tags are still proprietary applications using only a single kind of RFID tags, and on the other hand by the fact that the possibilities of RFID technology for data exchange between mobile devices have not yet been fully recognized.

SUMMARY OF THE INVENTION

It is desirable to have a polling scheme, wherein two multifunctional devices can properly select items or digital data to share or exchange between the two of them simultaneously for sending and to resolve a data exchange conflict in this case. Hence, both multifunctional devices are in the initiator mode or in the target mode intending to transmit data and no exchange would be possible if they remained in this mode, such as two RFID tags waiting for each other to receive a wakeup signal from the other device.

It is also desirable to avoid problems that can occur with mobile NFC multifunctional devices in the situation in which a device uses an RFID module provided by a different manufacturer or is provided with a different protocol than a tag the other multifunctional device operates with. That is, it would be desirable to solve compatibility problems.

Another situation that may be desirably avoided is the problem that a user might have set an exchange mode and then changes his mind without changing the mode of the multifunctional device from an initiator mode or (an active or passive) target mode to the other mode. Thus it is also desirable to enable a device to recognize another multifunctional device, a new RFID tag or a new RFID reader while nearly simultaneously performing e.g. a data exchange with another tag, a tag-reader or another multifunctional device in an interleaved way.

According to a first aspect of the present invention, there is provided a method for operating multifunctional NFC devices or RFID devices in environments, where interaction is desired between RFID or NFC capable devices using multiple data formats according to multiple protocols of multiple standards. In a basic embodiment the method comprises performing a first initiation procedure for a first data format according to a predetermined protocol of a predetermined first standard, performing a second initiation procedure for a second data format according to a protocol of a predetermined second standard, performing a delay, and repeating these operations in a cyclic or repetitive process. It is to be noted that the expression "near field communication" (NFC) encompasses "RFID" in the whole present specification. NFC fully comprises the features of RFID technology.

In the wording of the conventional RFID technology the method of the invention comprises according to one aspect thereof, performing a tag contact procedure for a first kind of RFID tag, performing a tag contact procedure for a second kind of RFID tag, followed by at least one waiting period.

In the case of RFID tags the first initiation procedure can be a contact procedure for the first kind of RFID tags that may comprise performing a first cardwarming procedure by sending a first radio frequency signal sequence for a first predetermined period of time with a first output power, activating a receiver mode of said multifunctional device and evaluating received data signals according to a first data format, and if no response is detected performing a first cardcooling procedure for a second predetermined period of time. That is, in the environment of multifunctional devices, the method starts with a polling procedure or an initiation procedure for an NFC connection according to a first data format, protocol or standard.

The second initiation procedure in the case of RFID tags can be a contact procedure for the second kind of RFID tags also comprising performing a second cardwarming procedure by sending a second radio frequency signal sequence for a third predetermined period of time with a second output power, activating a receiver mode and evaluating received data signals according to a second data format, and again if no response is received performing a second cardcooling procedure for a fourth predetermined period of time. That is, the method continues with a polling procedure for a second kind of RFID tags.

That is, in the environment of multifunctional devices, the method continues with an initiation procedure for another NFC connection according to a second data format, protocol and/or standard.

This combination of polling procedures may be referred to as "double polling" or "double initiation".

In case of RFID tags the transmitting periods, the frequencies and the transmitting powers of the first cardwarming procedure can be different from the respective values of the second cardwarming procedure. The receiver mode activation periods, the frequencies and the evaluation logic of the first receiver mode activation and evaluation are expected to be different from the respective values of the second receiver mode activation and evaluation of received signals. The cardcooling time periods of the first cardcooling procedure can also be different from the periods of the second cardcooling procedure.

That is, the method according to an embodiment of the present invention starts by polling or attempting to contact or read out different kinds of RFID tags or multifunctional NFC devices.

This "double polling" is followed by one of the three different delay periods. During the delay periods the multifunctional device is in a delay state with deactivated receiver, transmitter or transceiver saving battery power. The delay period can be a delay period of predetermined length, a first random delay period of a first random time within a first time frame or a second random delay period of a first random value within a second time frame.

This feature advantageously addresses most of the above problems. The NFC multifunctional device is capable of contacting different kinds of RFID tags or NFC multifunctional devices subsequently. This is achieved in the example by the initiation procedure for the first kind of NFC multifunctional devices followed by the initiation procedure of the second kind of NFC multifunctional devices.

That is, if the multifunctional device is actually busy when attempting to read digital information from e.g. a first RFID tag (or from a NFC multifunctional device) a connection to a different type of RFID device (or from a NFC multifunctional device) can be initiated during the second contact procedure.

For example, if a user has set up data to be sent to a NFC multifunctional device of a friend but then has reached e.g. an RFID barrier earlier than expected and needs to present a ticket, the multifunctional device can recognize an RFID reader at the barrier as an indication for a required signal transmission. The user would not have to change the terminal's NFC searching mode of the multifunctional device before being able to perform a different action. This basic method enables the multifunctional device to transmit data nearly simultaneously to different kinds of tags, readers or multifunctional devices when already having set up digital data to be exchanged by a NFC contact with a second multifunctional device.

The three different delay periods are used to address different technical problems. The delay periods of predetermined length can be used to reduce the overall power consumption of the mobile device due to limited battery capacities. The two different random length delay periods are used to address another problem that may occur in case of e.g. two multifunctional devices trying to perform initiation procedures for each other simultaneously.

If two different devices synchronously transmit initiation signals these devices are not able to receive or recognize any initiation signal. If the initiation procedures are synchronized, the devices can not recognize each other in the future, if the devices stay synchronized. The use of random delay periods breaks up any synchronization that may occur while the steps of the invention are repeated.

This basic polling scheme alternates between the different data formats, protocols and/or standard and provides sufficient delay time so that processor loading is not excessive in a mobile device.

The method is restarted, wherein the first step of the first initiation procedure is repeated after the random delay period has passed.

This repetition represents the transition of a single NFC "double polling" event to a mode wherein the mobile multifunctional device searches its environment periodically for available RFID tags, RFID readers or NFC multifunctional devices. This embodiment shows clearly the advantages of the random length delay periods breaking up any possible synchronicity between two different actively polling NFC multifunctional devices, polling the same RFID tag, another multifunctional device or polling each other.

This "double polling" is followed by one of said three different delay periods. Basically this embodiment represents a closed cycle procedure, wherein after each "double polling" a fixed length delay period or one of two random length delay periods are used, wherein the random delay periods following (directly or indirectly) the fixed value delay periods are alternated. It is envisaged that the random length periods are used strictly alternately. It is possible to use e.g. the first random value length delay period with a time frame between a first time value of e.g. 50 ms and a second time value of e.g. 125 ms. It is possible to use the second random value length delay period with a time frame between a first time value of e.g. 0 ms and a second time value of e.g. 100 ms.

In another example embodiment said method further comprises performing at least one further initiation procedure for at least one further data format, protocol or standard. This embodiment represents the transition to a triple, quadruple, or multi-polling scheme.

In the case of the conventional RFID tag environment this would be implemented by performing at least one additional cardwarming procedure by sending an additional radio frequency signal sequence for an additional predetermined period of time with an additional output power, activating said receiver and if a data signal has been received evaluating received data signals according to an additional data format's timing; and performing an additional cardcooling procedure for another additional predetermined period of time.

In this embodiment the principle of the "double polling" is extended to a "triple polling", "quadruple polling" or more, by adding additional initiation procedures to the protocol detection time. In this embodiment of the present invention the additional data formats according to additional protocols of additional standards can be made accessible by extending an actual double polling scheme any additional polling sequences in other data formats, protocols and standards. This embodiment represents the transition from a "double polling" to a "multiple polling" NFC communication initiation scheme.

In an example embodiment the method of the present invention further comprises performing a first passive detection procedure for at least one third kind of data format according to a protocol of a certain standard.

This embodiment comprises or represents the device in the role of an active target. In contrast to the device during the delay period the receiver of the multifunctional device is activated and capable of receiving and responding to (at least one kind of) initiation signals. The expression "third kind of data format" has been selected to underline the fact that the data formats used by the multifunctional device in initiation procedures may be different from the data formats used in passive detection procedures.

In the passive detection procedure the multifunctional device may act as a passive target or as an active target as defined in the introductory portion of the specification. That is, during said performing of said passive detection procedure the detection of more than a single data format according to more than only a single protocol of a single standard is contemplated.

In another example embodiment the method further comprises: at least one second passive detection procedure for at least one fourth kind of data format according to a protocol of a certain standard.

The first passive detection procedure and the second passive detection procedure can be performed in direct succession, in form of a "double passive detection procedure".

It is to be noted that the first and second data formats (protocols and/or standards) may be the same as the third and fourth data format (first data format=third data format, second data format=fourth data format, or first data format=fourth data format, second data format=third data format). It is also contemplated to use completely different data formats (protocols and/or standards) for the initiation procedures and said passive detection procedures.

By using the passive detection procedures the device is actively trying to share an item or data for presenting in a selected format. This embodiment can be implemented as alternately using an RFID reader mode and an RFID-tag emulating mode of the multifunctional device. This embodiment represents a modified polling scheme with a data presentation field inserted into the sequence when the multifunctional device is in an active sharing/exchanging mode.

In just another example embodiment of the present invention said method further comprises performing at least one further passive detection procedure for at least one further data format different to said other data formats. This embodiment represents the transition to a triple, quadruple, or multiple passive detection procedure scheme.

In this embodiment the principle of the "double passive detection procedure" is extended to a "multiple passive detection procedure", by adding additional passive detection procedures to the protocol detection time. In this embodiment of the present invention the additional data formats can be made accessible by extending an actual double passive detection procedure scheme any additional passive detection procedure sequences in other data formats.

In one example embodiment, one of said delays is performed as a delay of a fixed length period of time. It may be noted that the delay periods can be different for each repetition of the method. It is e.g. envisaged to alternate between two different fixed lengths time periods. It is also possible to use a predetermined (or even random) sequence of different fixed length time periods. During the delay periods the transmitter and the receiver of the multifunctional device is deactivated to save power and extend the operation time.

In another example embodiment each second of said delays performed is a delay of a random length period of time.

In an additional example embodiment each second of said random length delays is performed as a delay of a random length period selected from a predetermined time range not including zero and each other random length period is selected from a predetermined time range including zero. This results in a sequence of a fixed length period delay, first random length period delay, a fixed length period delay and second random period delay.

In just another additional example embodiment of the present invention said method comprises the sequence of performing a first initiation procedure for a first data format according to a protocol of a certain standard (in the following the expression "according to a protocol of a certain standard" is abbreviated to "APS"); performing a second initiation procedure for a second data format APS, performing a delay of a fixed length period of time, performing a first initiation procedure for a first data format APS, performing a second initiation procedure for a second data format APS, performing a delay of a random length period of time randomly selected from a first time range, performing a first initiation procedure for a first data format APS, performing a second initiation procedure for a second data format APS, performing a delay of a fixed length period of time, performing a first initiation procedure for a first data format APS, performing a second initiation procedure for a second data format APS, performing a delay of a random length period of time randomly selected from a second time range, and repeating these operations in a repetitive process.

In case of an RFID environment this may be implemented as the sequence of the steps of "multiple polling, fixed time delay period, multiple polling, first time frame random delay period, multiple polling, fixed time delay period, multiple polling, and second time frame random delay period".

In yet another additional example embodiment the method comprises the sequence of performing a first initiation procedure for a first data format according to a protocol of a certain standard, performing a second initiation procedure for a second data format APS, performing a delay of a fixed length period of time, performing a first passive detection procedure for a third data format APS, performing a second passive detection procedure for the fourth data format APS, performing a delay of a random length period of time randomly selected from a first time range, performing a first initiation procedure for a first data format APS, performing a second initiation procedure for a second data format APS, performing a delay of a fixed length period of time, performing a first passive detection procedure for a third data format APS, performing a second passive detection procedure for the fourth data format APS, performing a delay of a random length period of time randomly selected from a second time range, and repeating these operations in a repetitive process.

In contrast to the above four "multiple polling" sequences, this embodiment of the present invention comprises two passive detection sequences.

Figure 4:
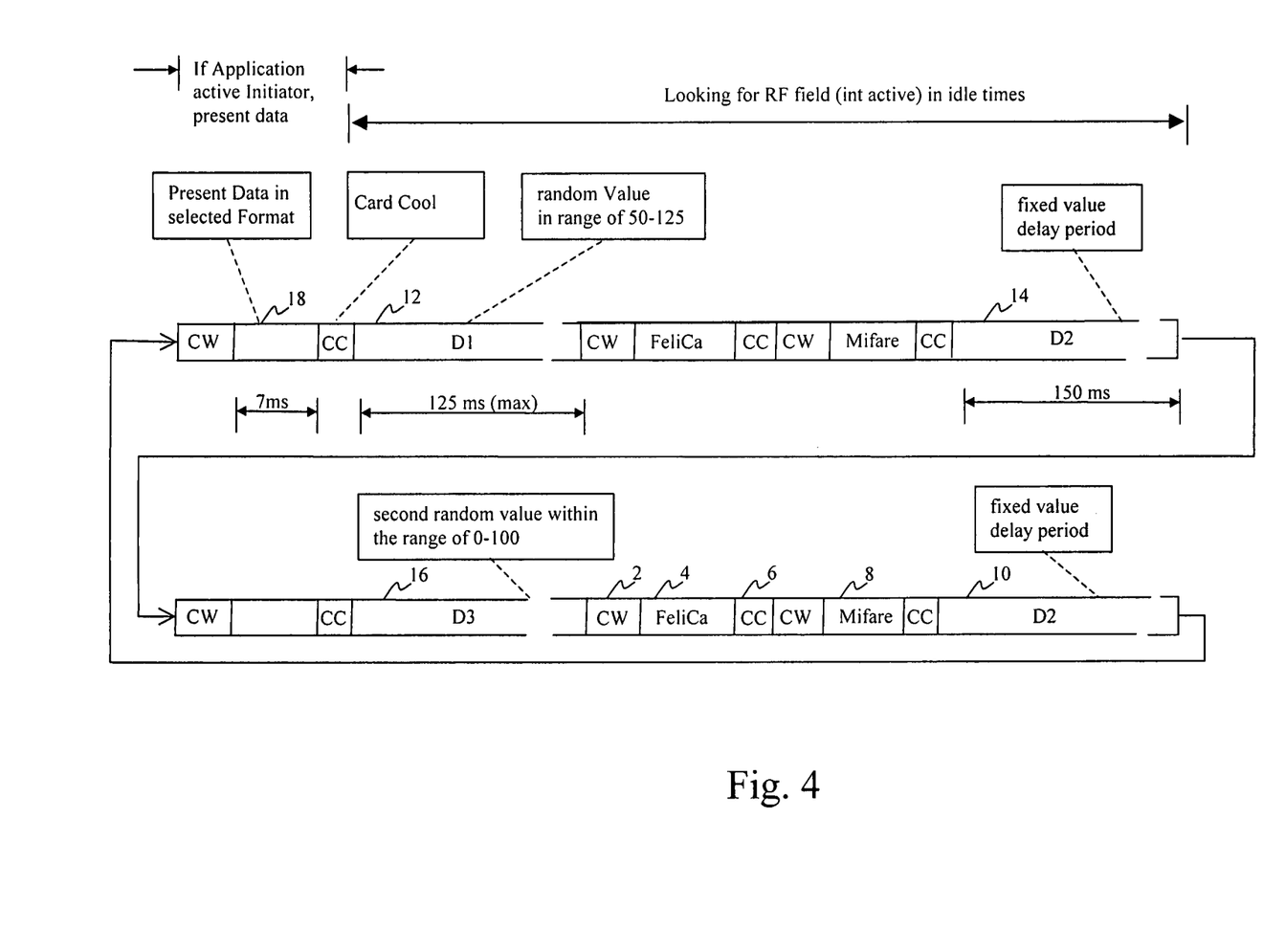
FIG. 4 is a flowchart of a modified RFID/NFC polling scheme according to another embodiment of the present invention.

The modified polling scheme is shown in FIG. 4, when the device is actively trying to share an item and data is presented in the selected format, protocol and/or standard. This presentation replaces only alternate polling time slots. These are the second and fourth slots shown in FIG. 4. This embodiment can be described as a NFC multifunctional device alternately using an RFID reader (initiator) mode and an RFID tag emulating (target) mode. It may be noted that the additional steps can be used to perform basically different operations. This embodiment represents a modified polling scheme with a data presentation field inserted into the sequence when the multifunctional device is in an active sharing or exchanging mode.

The data sent in a determined data format via said transmitter, may be sent in said first, in said second or even another, third data format according to a protocol of a certain standard.

In still another example embodiment said method further comprises changing the succession of said first and second data formats for said activation of said receiver mode and evaluating received signals, at least once with each second occurrence of said second random delay period. This feature changes the succession of the data formats APS in successive multiple polling events.

In another example embodiment during said performing of said first, second and/or further initiation procedure the detection of more than one format is possible. This feature can be enabled by a separated evaluation of a received signal according to different data formats. This can be achieved by storing received data signals, and a number of subsequently performed different evaluation processes. That is, the detection of more than one data format is contemplated upon any signal received in a signal detection slot.

In an example embodiment said initiation procedure comprises sending a first radio frequency signal sequence for a first predetermined period of time with a first output power, activating a receiver for receiving data signals, and sending a second first radio frequency signal sequence for a second predetermined period of time with a second output power, if no data signal has been received.

When the multifunctional device is trying to contact a passive target such as an RFID tag or another multifunctional device in a passive target mode the signal sequence for a first predetermined period of time with a first output power can be a continuous wave. signal to power up the passive target. When the multifunctional device is trying to contact an NFC active target i.e. another multifunctional device in an active target mode, the signal sequence for a first predetermined period of time with a first output power can be an interrupted signal sequence having gaps enabling the reception of an answer during said gaps. The signal sequence for an active target can also comprise multifunctional device identification data.

In another example embodiment the method further comprises evaluating received data signals according to at least one data format, if a data signal has been received.

In yet another example embodiment of the present invention said step of activating said receiver and said step of evaluating received data signals according to an additional data format's timing, if a data signal has been received, are performed separately. That is, the received signal detection is separated from the later evaluation of the data format in order to speed up the polling process.

It should be mentioned that during the delay periods a detection of RF fields (e.g. due to an activated receiver) is possible. That is, the device in a delay mode may be operable in a "tag emulating" mode being able to detect wake up signals from other readers or multifunctional devices.

In still another example embodiment of the present invention said method is performed by a near field communication multifunction device that is a multifunctional RFID reader. In this embodiment the method is restricted to any kind of initiation procedures, e.g. at least the first initiation procedure of a data format according to a protocol of a certain first standard, and said second initiation procedure of a data format according to a protocol of a certain second standard. Additionally the reader is capable of one or more of a number of different delay procedures. An RFID reader performs this embodiment of the method wherein only the passive detection steps of some of the above embodiments are excluded from being performed. That is, it is assumed that a multifunctional RFID reader preferably can read different RFID tags and may communicate with different NFC multifunctional devices but is not capable of emulating RFID tags.

According to another aspect of the present invention, a computer program product downloadable from a server for carrying out the method for operating a near field communication multifunctional device to perform enhanced NFC-polling of the preceding description is provided, which comprises program code for performing all of the steps of the preceding methods when said program is run on a computer or a network device.

According to yet another aspect of the invention a computer program product is provided comprising program code stored on a computer readable medium for carrying out the methods for operating a near field communication multifunctional device to perform the enhanced NFC-polling method of the preceding specification, when said program product is run on a computer or a network device.

According to yet another aspect of the present invention an electronic near field communication module for near field communication devices is provided for environments with different data formats used according to different protocols of different standards. The device comprises at least one antenna, a receiver, connected to said at least one antenna, a transmitter connected to said at least one antenna, a processing unit connected to said receiver, and connected to said transmitter, and a memory unit connected to said processing unit. Said memory unit is adapted to store at least a first data format, a second data format, each according to a protocol of certain first and second standards, respectively. Said processing unit is configured to perform, via said transmitter, said receiver and said antenna a first initiation procedure for a first data format, a second initiation procedure for a second data format, a delay, and to repeat these operations in a repetitive process.

In other example embodiments the device is also configured to perform additional initiation procedures and passive detection procedures.

The known components can provide a standard RFID reader functionality, while it is also possible with the basic device to perform RFID tag emulation and a data transmission mode.

In another example embodiment said electronic near field communication module further comprises a random value generator, and a timer, both connected to said processing unit. Said processing unit is configured to determine the length of different time periods in accordance with said timer and is further configured to determine the length of random length delays in accordance with random values obtained from said random value generator.

In a multifunctional device implementation the processing unit is connected to said timer and to said random value generator, for timing the initiation procedure and the passive detection procedure and to be able to perform delay periods of determined time length and random length delay periods. It is also possible to incorporate said timer and/or said random value generator into said processing unit. Said random value generator may also be incorporated into said timer. The random value generator is provided to enable said delay periods to have random-length duration as disclosed in the above description of the method of the present invention.

Said memory unit can be adapted to store a first data format, a second data format (according to a first and a second predetermined protocol of a first and a second predetermined standard, respectively), a length of a period of determined length, and the time frames of two different random delay periods. It is also possible that the memory device also stores values of different lengths for different periods of different determined lengths.

It may also be noted that in the present invention a time period of random length (within a determined time frame not including "0") may also be composed of a fixed length time period and a subsequent period of random length within a determined time frame including "0".

In the basic embodiment directed to NFC multifunctional devices in a passive target environment said processing unit is configured to perform via said transmitter and said antenna a first and a second initiation procedure, comprising activating said receiver mode and evaluate received data signals according to a first and a second data format APS, and to perform at least one of three different waiting procedures. The three different waiting procedures comprise at least one delay period of determined length, a first random-length delay period with a first time frame and a second random-length delay period, with a second time frame.

It may be noted that the NFC module may also comprise two or more different antennas, two different transmitters and two different receivers, each tuned to a different frequency range that may use the same or different modulation schemes.

With these components the module of the present invention can contact different kinds of RFID tags or RFID readers and NFC multifunctional devices and can use RFID technology for NFC data communication.

It may also be noted that the module of the present invention can be provided with a module interface to be connected to or to be incorporated into e.g. a mobile multifunctional device. It seems to be clear that such an interface can be implemented to be compatible to any kind of data exchange interface that can be provided in a mobile multifunctional device.

The present invention relates to a short-range near field communication module, wherein the present invention provides a module in a mobile multifunctional device to indirectly and internally utilize RF-tag module information stored in connection with the RF-tag module of a multifunctional device to enhance and direct subsequent operation of a multifunctional device.

In another example embodiment said near field communication module is provided with a built-in memory device storing a pre-defined sequence of the steps of the method. This enables the device to use an arbitrary predefined sequence of initiation and passive detection procedures and delays.

In an example embodiment of the present invention said processing device is further configured to send data in a determined data format subsequently to a passive detection procedure. Said data format can be said first or second data format, but it is also possible to use another (third) data format for the transmission of data. This embodiment explicitly represents the ability of the module to send data as required for emulating a tag, for data presentation to other NFC multifunctional devices.

According to another aspect of the present invention an electronic NFC enabled multifunctional device is provided. The electronic NFC multifunctional device basically comprises the same components as the NFC module, i.e., an antenna, a transmitter a receiver, a processing unit, a random value generator, a timer, and a memory unit. In contrast to the module solution the processing unit may also be used for other applications, such as e.g. data communication, data processing or even music and or video replaying.

It is contemplated that the electronic NFC multifunctional device of the present invention can be a mobile multifunctional device.

Compared with the NFC module the NFC multifunctional device further comprises a storage device connected to said processing unit for storing received and evaluated data.

In an example embodiment said electronic NFC multifunctional device is further provided with a user interface.

The multifunctional device can also be provided with a user interface to display any kind of data received via said receiver. It is also possible to provide the device with an interface to a computer to enable NFC data post-processing with a computer device. The interface with the computer device may also be implemented using NFC technology. A computer interface enabling access to the data stored in said multifunctional device may also be regarded as an indirect user interface.

In another example embodiment of the present invention said electronic NFC multifunctional device further comprises an interface to a communication network. The interface can be e.g. an interface to a wired local area network, to wireless (local area) network, or to a wide area network.

In still another example embodiment of the present invention said communication network interface is an interface to a cellular telephone network. That is, the electronic NFC multifunctional device comprises or is incorporated in a mobile telephone. This embodiment of the present invention represents an RFID reader in a cellular phone. The present invention provides an NFC multifunctional device in a mobile phone, capable of reading RFID tags of at least two different data formats, emulating RFID tags and performing near field communication with other NFC multifunctional devices. The mobile phone may use a processing stage of a cellular phone to read data from an RFID tag or from an NFC multifunctional device. The mobile telephone can rely on RFID data transfer technology to exchange data with other (possibly cellphone enabled) NFC multifunctional devices when within range. The mobile telephone of the present invention uses the method of the present invention and is therefore capable of detecting and polling different kinds of RFID tags, emulating RFID tags, setting up a connection to another NFC multifunctional devices, for sending or receiving digital data.

In another example embodiment of the present invention said electronic near field communication enabled multifunctional device is a multifunctional RFID reader. NFC devices comprise as special embodiments RFID devices. Therefore the multifunctional NFC devices may be embodied as a multifunctional RFID reader. The multifunctional RFID reader is capable of reading information from different kinds of RFID tags and from NFC multifunctional devices (at least in the RFID tag emulation mode). The multifunctional RFID reader device can perform at least the first initiation procedure of a data format according to a protocol of a certain standard, said second initiation procedure of a data format according to a protocol of a certain standard and one of a number of different delay procedures.

According to yet another aspect of the present invention an electronic NFC system is provided. The electronic NFC system comprises at least two different electronic NFC multifunctional devices as disclosed in the preceding specification. The electronic NFC system uses at least one NFC communication device that uses the communication method of the present invention. It is also possible that both NFC multifunctional devices use the operating method for near field communication devices in environments with different used data formats. In this case the different random delay periods ensure that both devices can communicate, as an interlocked communication state with mutually synchronized initiation procedures can not occur.

By using the method of the present invention, at least one of the electronic NFC multifunctional devices is capable of polling and detecting other RFID tags, RFID readers or NFC multifunctional devices present in the environment. The method of the present invention also enables an active data transfer from one NFC multifunctional device to another one.

BRIEF DESCRIPTION OF THE FIGURES

In the following the invention will be described in detail referring to the enclosed drawings in which.

DETAILED DESCRIPTION OF THE INVENTION

Figure 1:
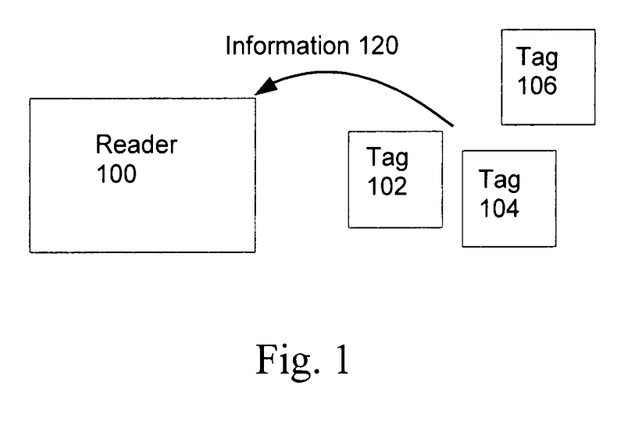
FIG. 1 is a diagram visualizing the state of the art of RFID technology with one RFID reader capable of retrieving information from RFID tags.

FIG. 1 representing the state of the art is a diagram visualizing the state of the art of RFID technology with one RFID reader 100 capable of retrieving information from different RFID tags 102, 104, 106 of the same data format. Today, the RFID implementations are readers 100 interrogating tags 102, 104, 106 that are carried by people, placed on goods, or tickets or have some intrinsic value contained in them such as, e.g., tickets or e.g. telephone cards. The reader 100 can be incorporated in doors, ticket barriers, and production lines, access control systems or even in non contact cashing systems in supermarkets. The information transfer is performed in a kind of semi half duplex communication. The reader sends a wake up signal to induce a tag to transmit information stored in said tag. They are frequently proprietary closed systems wherein it is required that the tags 102, 104, 106 are to be understood by only one type of RFID reader system 100.

Figure 2:
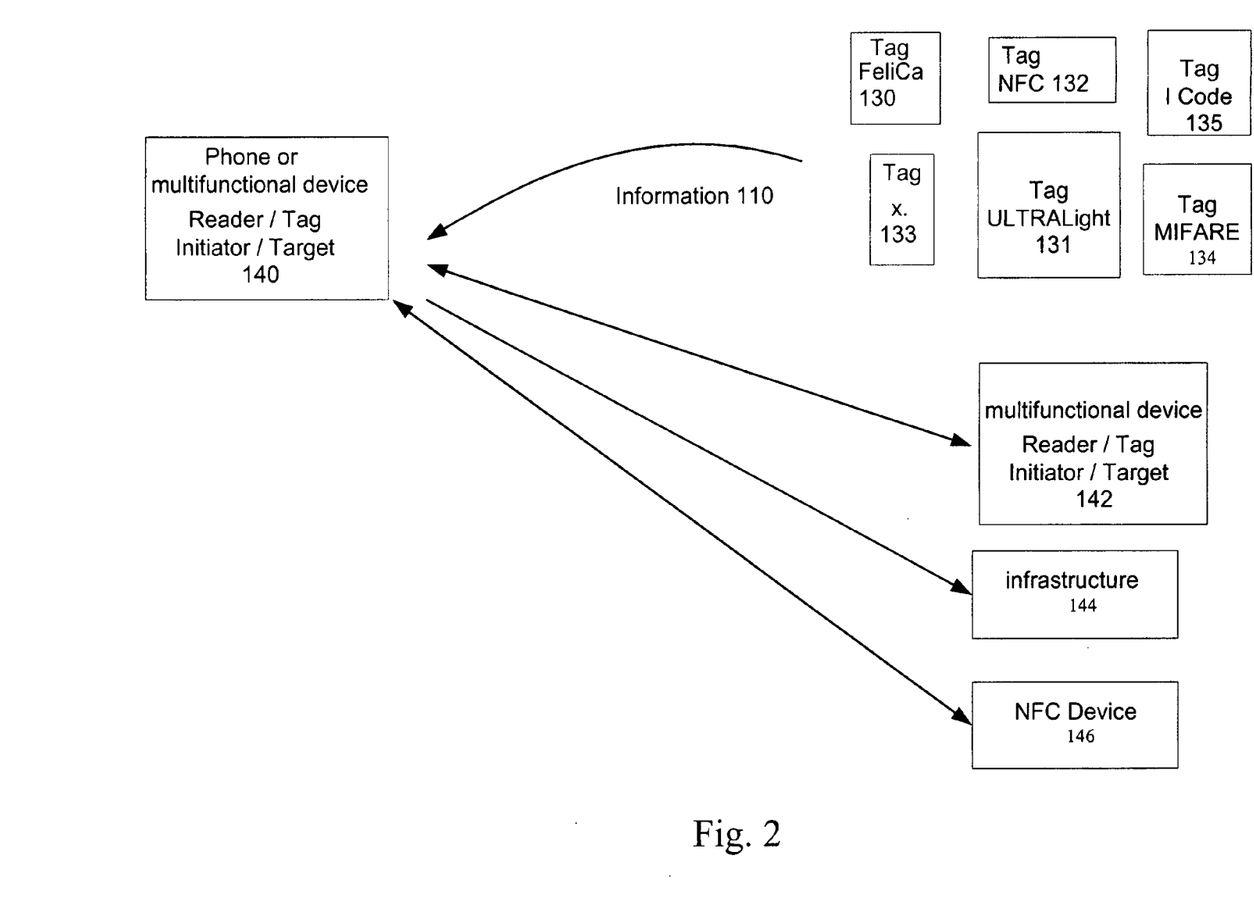
FIG. 2 is an example of an improved NFC multifunctional device architecture capable of communicating with different RFID tags and different NFC multifunctional devices.

FIG. 2 is an example of an improved RFID/NFC architecture capable of communicating with different RFID/NFC devices. In the future and with the help of the present invention the NFC environment will be a more global and open one, when the phone or NFC multifunctional device 140 will have the need to understand and interact with a variety of tags 130, 131, 132, 133, 134, 135, with different data formats APS, other (mobile) multifunctional devices 142, infrastructure devices 144 and other near field communication devices 146. The problem is that in this open and diverse environment several lockout conditions may occur. An approach to a detection scheme is needed to resolve this set of complex multi-format and multi-mode conditions that will be received by the multifunctional device 140.

The detection scheme is intended to resolve the first step of determining the presence of an RFID tag or a NFC multifunctional device, and the second stage of resolving which one it has detected. Data processing and communication is a secondary step, which can not be performed until the detection issues are resolved.

Figure 3:
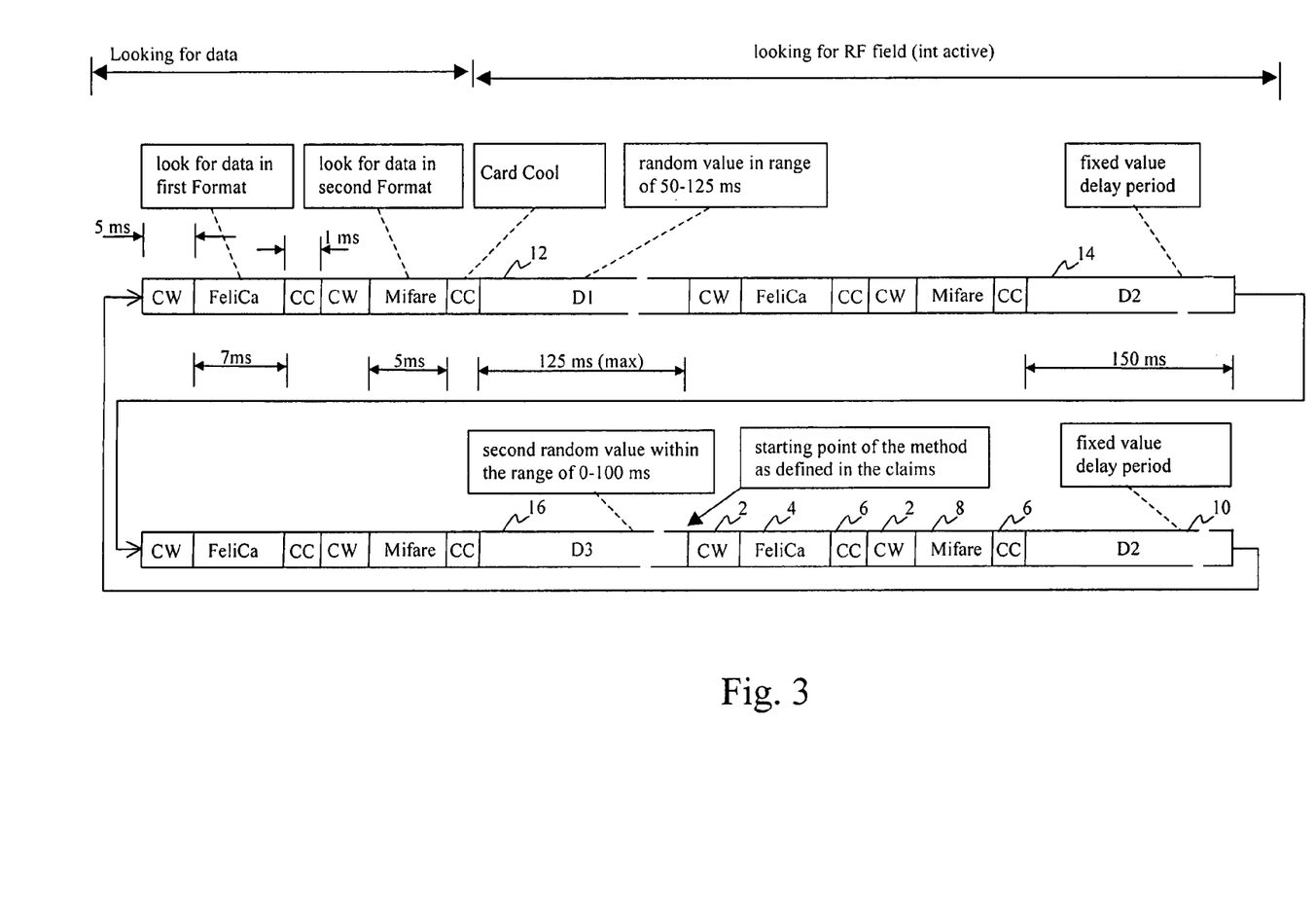
FIG. 3 is a flowchart of an RFID/NFC polling scheme according to one embodiment of the present invention.

FIGS. 3 and 4 show that the multifunctional device 140 is spending most of its time listening in a low power mode to determine if an interaction is needed. This is interspersed with short and time varying challenges in differing formats to establish if NFC multifunctional devices or RFID tags are within range. The addition of one or more delay elements with variable length and changing duration to the sequence resolves the issue of NFC multifunctional devices being locked out in synchronicity.

In this environment the following lockout condition may occur for the multifunctional device 140 when:

the multifunctional device 140 is trying to interact with a tag or another multifunctional device and uses the wrong data format, protocol and/or standard;

the multifunctional device 140 presents an initiation procedure or data to a second device and both are in an active share or a digital item presentation mode;

the multifunctional device 140 is in an "RFID reader" mode when facing an infrastructure reader that is expecting an RFID tag or a multifunctional device emulating an RFID tag;

the multifunctional device 140 is in a data presentation (i.e. "tag emulating" or "target") mode and is facing a multifunctional device in an RFID tag emulating mode or an RFID tag;

the multifunctional device 140 is presented to a similar device that is stepping synchronously through the same sequence and they will not perceive each other.

The present invention can be provided with e.g. the polling schemes of FIGS. 3 and 4, and hence with a solution for preventing the lockout situations above.

For the sake of clarity the FIGS. 3 and 4 are examples in an RFID tag environment using cardwarming (CW) and cardcooling (CC) procedures. For a general implementation in an arbitrary environment, the respective cardwarming or cardcooling steps have to be exchanged by respective steps of the desired initiation process between NFC multifunctional devices.

FIG. 3 is a flowchart of an RFID polling scheme according to one embodiment of the present invention. In this scheme a short 10 ms to 30 ms (milliseconds) period of searching for data in different formats is repeated at time intervals that will be changing. Card cooling is included in order to permit the card a time period to switch off from the last read before changing formats. This card cooling is also included at the end of the scanning process since one of the timer periods can be short. The interval timers each have differing values in order to maximize the potential for detection by one of the multifunctional devices when they are both selected for the same or a similar transaction, such as data sharing. Additionally, a card warming time is also needed.

Basic polling is performed in the sequence shown in FIG. 3. "CW" is card warming 2 and needs to be performed to get passive cards into a state in which they are ready to respond when queried by a reader. The cardwarming period is set to a time period of approximately 5 ms. "CC" is card cooling 6 and is needed when changing format so that a passive card has time to relax before a different operation is performed with it. The cardcooling period is set to a time period of approximately 1 ms. This sequence has three delay types D1, D2 and D3. The variation in the delay sequence is needed to provide sufficient offset between any two mobile devices so that, if they both enter the same state of share/exchange, then one device is guaranteed to detect the other within a short time. D1 is a random number within a high time frame; D2 is fixed and is used twice, once following D1 and a second time following D3. D3 is a random number within a low time frame. Since this can be zero the card cooling must be retained prior to D3. The periodicity of this will change as a result of the two changing random intervals which are provided to promote the establishment of a connection between multifunctional devices when both multifunctional devices are acting as initiators.

The method may be described most simply if the closed loop of the polling scheme is started with the cardwarming procedure (CW) 2 following the delay period D3 marked with the reference number 16.

The selection of this starting point prevents that the method is started with a delay period. In FIG. 3 the polling scheme comprises four "double polling" events separated by different delay periods. These "double polling events" comprise two polling events, each of a cardwarming procedure 2, followed by a reception ready period 4, 8 during which an activated receiver is ready to receive a transmission or a signal from another device or from an RFID tag. If there is a signal received during this period with activated receiver mode, this signal is analyzed and evaluated according to a specific data format, protocol and/or standard. The reception ready period is followed by a cardcooling procedure 6 to enable any NFC multifunctional device in the vicinity to resume a fully defined state. In case of e.g. an RFID tag this cooling time is used to resume a sleep mode or to discharge any semi-powered capacitors.

The first polling event 4 comprises the first reception ready period 4 marked with "FeliCa" and which represents an expected data transmission in a first data format (here FeliCa). The reception ready period for "FeliCa" is set to a time period of approximately 7 ms. If there is a signal received during this period with activated receiver mode, this signal is analyzed and evaluated according to the FeliCa standard.

This first polling procedure is followed by a second polling event, with the difference that the second polling event comprises a second reception ready period 8 marked with "Mifare" wherein a reception of a transmission according to the "Mifare" standard is expected. The reception ready period for "Mifare" is set to a time period of approximately 5 ms. Additionally, within the second looking phase, interrupts are enabled so that later applications such as a ticketing can be activated from the RF field detection.

Following the connection to a near field device and uploading of data, the content format must be validated and the action/processing selected as needed. Following the detection of an active device RF field the ISR (Interrupt Service Routine) must then hand over to the same content format validation process. This resolves the detection issue, and negotiation between the two multifunctional devices will be needed to determine if and which exchange should be continued.

That is, the method of the present invention is started with a first double polling procedure searching for different near field communication connections. In the Figures it can be seen that data is searched in different data formats (Sony "FeliCa", and Philips "Mifare").

Since this is a signal detection process other encoding formats such as NFC (Near Field Communications) can be detected in the same polling function. For some NFC devices that are self powered ("active targets") this is the active NFC device, a cardwarming time is not strictly needed, but it should be retained to promote the ability for the detection process to communicate with both active and passive targets.

It is to be noted that the present invention can readily be extended to other near field standards too, including e.g. NFC, ISO 14443-4 or ECMA 352. This extension of the method is resulting in a "triple polling procedure" or a "quadruple polling procedure" by adding the relevant cardwarming, receiving and cardcooling steps. Hence, full ECMA 352, ISO/IEC 18092 and other differing formats can be included in this detection concept.

After each "double polling" or "multiple polling" the device enters a delay period. In the Figures the first delay or delay period 10 indicated as D2 after the "first double polling" has a fixed length. It is for example possible to select the length of D2 10 between e.g. 100 ms and 200 ms. D2 may comprise a fixed time of e.g. 150 ms. By using delay periods the power consumption of the device can be reduced as the duty cycle of the transmitter (and the receiver) is reduced.

After the first delay period the double polling procedure is repeated as a "second double polling" procedure, followed by a first random length delay period 12 marked as D1. The field D1 in the polling chain is a time slot with random length. This ensures that, if two devices are in the sharing state simultaneously, a lock out condition can be avoided and at least the other device can receive data. The first random length, the delay period 12, can have any duration value between a minimum value of 10 ms up to 200 ms and can have preferably any duration between 50 ms and 125 ms. That is, the first random length delay period comprises a minimum duration longer than e.g. 50 ms and shorter than 150 ms.

After the first random length delay period the double polling procedure is repeated as a "third double polling". The double polling procedure is followed by a second fixed length delay period 14 (indicated as D2). In the Figure the first delay period 14 also has a fixed length. It is possible that the duration of the first fixed length delay period is different from the second fixed length delay period. The length of the fixed length time period 14 can be between e.g. 100 ms and 200 ms. D2 can also comprise a fixed time of e.g. 150 ms. By using fixed length delay periods with the same duration the polling scheme can be simplified.

After the second fixed length delay period a "fourth double polling" procedure is performed. The fourth "double polling" is in turn followed by a second random length delay period indicated as field D3. This second random length delay period 12 can have any duration value between a minimum value of 0 ms up to 150 ms and preferably between 0 ms and 100 ms.

After the second random length delay period has passed the polling scheme returns to the beginning, to the first "double polling procedure" for repetition.

As can be seen from the time durations indicated for activation on RF detection interrupts each device is for the most part in a delay state and saves battery power. The devices in the delay state have a deactivated receiver, but are also in a condition to be able to respond to an RF field when one is received or presented as e.g. a conventional RFID tag.

FIG. 4 shows a modified polling scheme of an NFC multifunctional device. The modification relates to the addition of a data presentation in a short time slot before each of the delay points in the sequence. A multifunctional device in the sharing state or the exchanging state enters these.

In modified the polling procedure of FIG. 4, two of the "double polling procedures" are replaced by a data presenting procedure 18. In the present example the data are presented for a minimum of 7 ms. The data are presented in the format determined by the application wishing to use the RFID/NFC service until the transaction has notification of a connection or the transaction is suspended, at which point the system returns to the basic polling loop as shown in FIG. 3. Upon establishment of a connection or detection of an RFID/NFC interrupt all polling/initiating is suspended until that activity has completed.

Hence, this utilization of a basic polling loop (see FIG. 3), with a modification (see FIG. 4), when share/exchange is selected is an efficient way to support the detection and presentation of data in the different formats needed. This sequence has the additional advantage that the multifunctional device remains in a low power state for the majority of the time.

Figure 5:
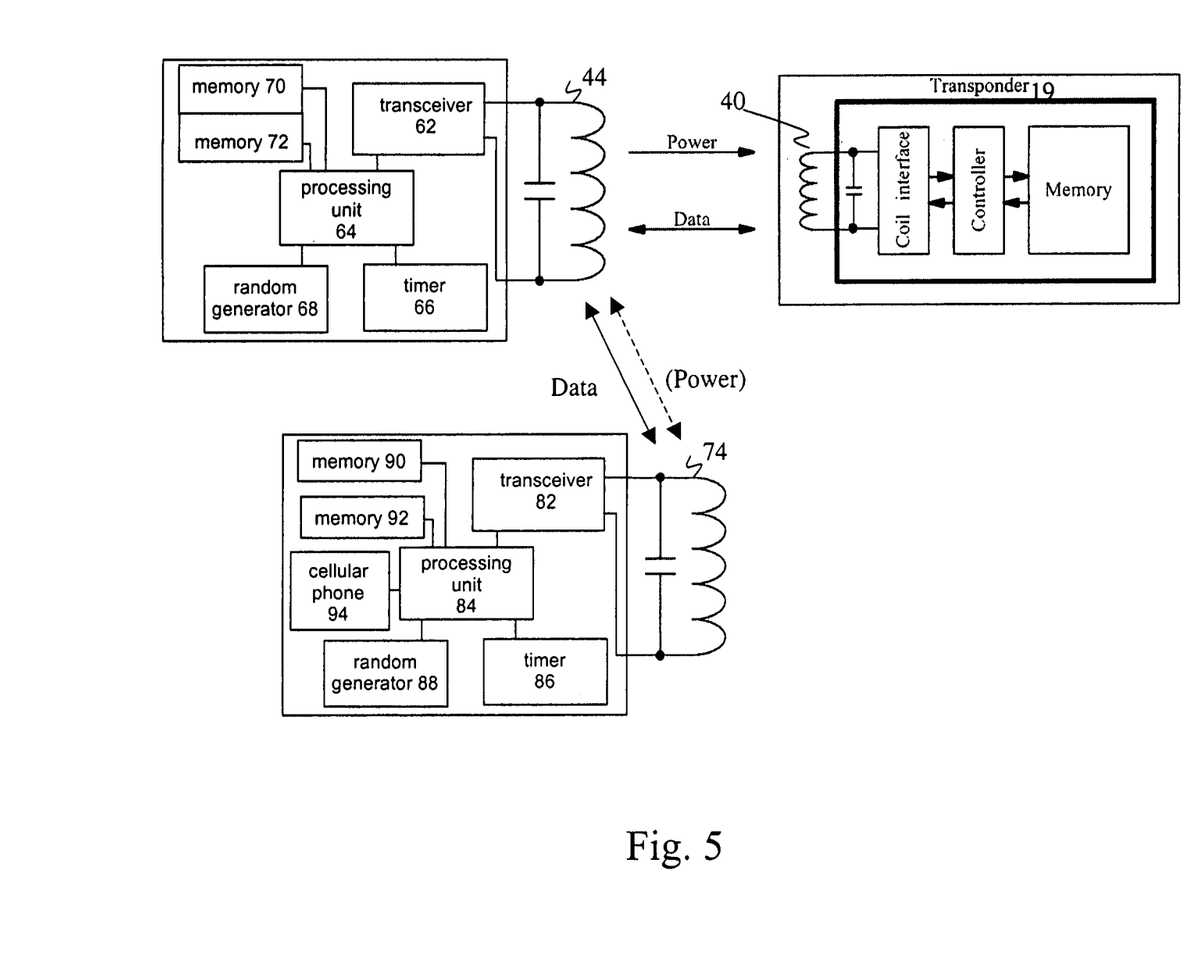
FIG. 5 is an example of a NFC multifunctional device according to the present invention in a NFC infrastructure.

FIG. 5 is an example of a near field communication system according to the present invention. The system is comprised of communicating RFID/NFC devices, a transponder or RFID tag 19, a NFC multifunctional module and a NFC multifunctional device.

The system comprises an RFID tag or transponder 19 provided with an antenna 40 and coil or antenna interface, a controller and a memory.

The NFC multifunctional module for NFC multifunctional devices in environments with different data formats used comprises an antenna 44 depicted as the coil/capacity combination. The antenna is connected to a transceiver 62. The NFC module further comprises a processing unit 64 connected to said transceiver 62. The module also comprises a random value generator 68 and a timer 66, both connected to the processing unit 64. The module is further provided with a memory unit 70 connected to said processing unit 64.

The NFC multifunctional device for environments with different data formats used, comprises an antenna 74 depicted as the coil/capacity combination. The antenna is connected to a transceiver 82. The RFID module further comprises a processing unit 84 connected to said transceiver 82. The module also comprises a timer 86 and a random value generator 88, both connected to the processing unit 84. The module is further provided with a memory unit 90 connected to said processing unit 84. The NFC multifunctional device further comprises an additional memory unit 92 and a cellular phone (module) 94. In the Figure power supplies and user interfaces have been omitted in order not to obscure the description.

In the depicted system it is assumed that the NFC multifunctional module is actively communicating with the transponder 19, using a first data format. The module can perform this communication as the said memory unit 70/72 stores a first data format and a second data format. The memory unit also stores e.g. the length of a delay period of determined length, and the time frames of at least two different random delay periods.

The processing unit 64 of the module is configured to perform via said transceiver 62 and said antenna 44, a first and a second cardwarming procedure, activate said receiver mode and evaluate received data signals according a first data format, if said data where received from said transponder 19, and evaluate received data signals according to a second data format, if said data where received from said near field data device, and to perform a first and a second cardcooling procedure, and perform three different delay or delay procedures comprising a delay period of determined length, and two random delay periods of a random value with a first and a second time frame, respectively.

According to the method of FIGS. 3 and 4 the near field communication module can communicate with transponder 19 e.g. in a first data format and can also communicate with the near field communication device using a second data format. According to FIG. 3 the module may communicate with the transponder 19 in the "FeliCa" form and with the device in the "Mifare" format according to FIG. 3 or 4.

The present invention may be implemented in the simplest way by a software processing function, using the information about the users currently operated selections.

The present invention provides the advantages that all desired or available RFID formats can be supported. The present invention further provides an anti-collision contact scheme when both multifunctional devices want to act as initiators in a share or exchange mode, a lock out condition will not happen. The present invention can use a minimal activation time to provide a low power utilization to enable mobile implementations. The present invention provides the detection of all possible interactions within a reasonable time. The full data analysis is performed by a later data handling stage. All these advantages can be achieved by only a few extra bytes of code, and for the cost of a slightly extended delay as a consequence of the polling sequence of the invention.

The above embodiments of the present invention may be summarized by an operation of a multifunction RFID or near field communication device in environments where interaction is desired between tags, cards, readers and multifunctional devices using multiple data formats, standards or protocols; compromising the operations of: performing a read or initiation procedure for the first data format, standard or protocol, performing a read or initiation procedure for the second data format, standard or protocol, performing further read or initiation procedures for further data formats, standards or protocols as required, performing a passive detection or target procedure for the first data format, standard or protocol, performing a passive detection or target procedure for the second data format, standard or protocol, performing further passive detection or target procedures for further data formats, standards or protocols as required, performing a fixed or random delay, repeating these operations in a cyclic or repetitive process.

In one embodiment a single passive detection or target procedure is used to detect multiple data formats, standards or protocols. A fixed or random delay may not be used or is embodied in one of the other read/initiate/detect/target operations. In the whole specification the expressions "data format standard and/or protocol" or "data formats according to a protocol of a standard" have been abbreviated by the expression "data format".

This application contains the description of implementations and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method, comprising:
    determining to perform a first reader mode initiation procedure in a first data format according to a first protocol,
    determining to perform a second reader mode initiation procedure in a second data format according to a second protocol,
    determining to perform a delay, and
    determining to perform any of these operations in a repetitive process wherein said delay comprises a plurality of delays including at least one fixed delay period and at least one share/exchange state lockout prevention random delay period, and wherein said at least one share/exchange state lockout prevention random delay period randomizes periodicity of share/exchange state.

2. The method according to claim 1, further comprising:
    determining to perform a second passive detection procedure in the first or the second data format or in a fourth data format according to a fourth protocol.

3. The method according to claim 1, wherein performing said delay comprises passively detecting an external radio frequency signal.

4. The method according to claim 1, wherein performing said first passive detection procedure comprises detecting an external radio frequency signal.

5. The method according to claim 1, wherein performing said first initiation procedure comprises receiving data in said first data format.

6. The method according to claim 1, wherein performing said first initiation procedure comprises transmitting an initiation signal in said first data format.

7. The method according to claim 1, further comprising:
    determining to perform at least one further initiation procedure in at least one further data format.

8. The method according to claim 2, further comprising:
    determining to perform at least one further passive detection procedure in at least one further data format.

9. The method according to claim 1, further comprising determining to perform a first passive detection procedure in a tag emulation mode in at least the first data format or the second data format.

10. The method according to claim 9, further comprising determining to perform the first passive detection procedure in the tag emulating mode in a third data format according to a third protocol.

11. The method according to claim 1, wherein said plurality of delays include delays of different fixed length delay periods.

12. The method according to of claim 1, wherein said random delay period is selected from a predetermined time range not including zero and for any other delays performed as a delay of a random length period of time, said random length period is selected from a predetermined time range including zero.

13. The method according to claim 1, wherein said delay of said random delay period is performed after said first and said second reader mode initiation procedures.

14. The method according to claim 9, wherein said delay of said fixed delay period is performed after said first passive detection procedure.

15. The method according to claim 1, wherein after a successful reader mode initiation procedure in one of said first or second data format, data is transmitted or received in the corresponding data format.

16. The method according to claim 15, wherein said data is received or transmitted in a data communication procedure during said repetitive process.

17. The method according to claim 1, wherein said performing of an initiation procedure comprises:
    determining to send a first signal sequence for a first predetermined period of time with a first output power,
    receiving data signals, and
    determining to send a second signal sequence for a second predetermined period of time with a second output power, if no data signal has been received.

18. The method according to claim 17, further comprising determining to evaluate received data signals according to timing of at least one data format, if a data signal has been received.

19. The method according to claim 1, wherein said method is performed by a near field communication multifunction device that is a multifunctional RFID reader.

20. The method according to claim 19, further comprising said near-field communication multifunction device determining to perform a passive detection procedure in a tag emulation mode.

21. The method according to claim 19, further comprising said near-field communication multifunction device determining to perform a passive detection procedure in a target mode.

22. The method according to claim 1, wherein said plurality of delays include at least two fixed delay periods.

23. A computer program product comprising a computer readable storage medium storing program codes thereon for use in a communication device, wherein said program codes comprise:
- instructions for determining to perform a first reader mode initiation procedure in a first data format according to a first protocol,
- instructions for determining to perform a second reader mode initiation procedure in a second data format according to a second protocol,
- instructions for determining to perform a delay, and
- instructions for determining to perform any of these operations in a repetitive process wherein said delay comprises a plurality of delays including at least one fixed delay period and at least one share/exchange state lockout prevention random delay period, and wherein said at least one share/exchange state lockout prevention random delay period randomizes periodicity of share/exchange state.

24. The computer program product according to claim 23, wherein said instructions for determining to perform said first or said second reader mode initiation procedure comprise:
- instructions for determining to send a first signal sequence for a first predetermined period of time with a first output power,
- instructions for receiving data signals, and
- instructions for determining to send a second signal sequence for a second predetermined period of time with a second output power, if no data signal has been received.

25. A computer program product according to claim 23, wherein said program codes are downloadable from a server in communication with said communication device.

26. An apparatus, comprising:
- a transceiver configured to receive signals in at least one radio frequency band and to transmit signals in said radio frequency band, and
- a processor coupled to said transceiver, wherein said processor is configured to:
  - determine to perform a first reader mode initiation procedure in a first data format according to a first protocol,
  - determine to perform a second reader mode initiation procedure in a second data format according to a second protocol,
  - determine to perform a delay, and
  - determine to perform any of these operations in a repetitive process wherein said delay comprises a plurality of delays including at least one fixed delay period and at least one share/exchange state lockout prevention random delay period, and wherein said at least one share/exchange state lockout prevention random delay period randomizes periodicity of share/exchange state.

27. The apparatus according to claim 26, further comprising a memory coupled to said processor, wherein executable instructions that if executed cause the processor to perform said operations are stored in said memory.

28. The apparatus according to claim 26, further comprising:
- a random value generator; and
- a timer, both coupled to said processor,
- and wherein said processor is further configured to determine lengths of different time periods in accordance with said timer and to determine lengths of random length delays of said at least one random delay period in accordance with random values obtained from said random value generator.

29. The apparatus according to claim 26, wherein said apparatus is hard-coded in a built-in memory device configured to carry out said first and second reader mode initiation procedures, said delay, and said repetitive process.

30. A device, comprising the apparatus according to claim 26 and a storage device configured to store received and evaluated data.

31. The device according to claim 30, further comprising a user interface.

32. The device according to claim 30, further comprising an interface to a communication network.

33. The device according to claim 32, wherein said interface to a communication network is an interface to a cellular telephone network.

34. The device according to claim 30, wherein said device is a multifunctional RFID reader.

35. The apparatus according to claim 26, wherein performing said delay comprises passively detecting an external radio frequency signal.

36. The apparatus according to claim 26, wherein performing said first passive detection procedure comprises detecting an external radio frequency signal.

37. The apparatus according to claim 26, wherein performing said first reader mode initiation procedure comprises receiving data in said first data format.

38. The apparatus according to claim 26, wherein performing said first reader mode initiation procedure comprises transmitting an initiation signal in said first data format.

39. The apparatus according to claim 26, wherein said processor is further configured to determine to perform at least one further reader mode initiation procedure in said first or second data format or in a further data format according to a further protocol.

40. The apparatus according to claim 26, wherein said processor is further configured to determine to perform at least one further passive detection procedure in said first, second or third data format or in a further data format according to a further data format.

41. The apparatus according to claim 26, wherein said processor is further configured to determine to perform a first passive detection procedure in a tag emulation mode in at least the first data format or the second data format.

42. The apparatus according to claim 41, wherein said processor is further configured to determine to perform said first passive detection procedure in said tag emulation mode in a third data format according to a third protocol.

43. The apparatus according to claim 26, wherein said plurality of delays include delays of different fixed length delay periods.

44. The apparatus according to of claim 26, wherein said random delay period is selected from a predetermined time range not including zero and for any other delays performed as a delay of a random length period of time, said random length period is selected from a predetermined time range including zero.

45. The apparatus according to claim 26, wherein said delay of said random delay period is performed after said first and second reader mode initiation procedures.

46. The apparatus according to claim 41, wherein said delay of said fixed delay period is performed after said first passive detection procedure.

47. The apparatus according to claim 26, wherein after a successful reader mode initiation procedure in one of said first or second data format, data is transmitted or received in the corresponding data format.

48. The apparatus according to claim 47, wherein said data is received or transmitted in a data communication procedure during said repetitive process.

49. The apparatus according to claim 26, wherein said performing of an initiation procedure comprises:
- determining to transmit a first signal sequence for a first predetermined period of time with a first output power via a transmitter part of said transceiver,
- receiving data signals via a receiver part of said transceiver, and
- determining to transmit a second signal sequence for a second predetermined period of time with a second output power via said transmitter part of said transceiver, if no data signal has been received.

50. The apparatus according to claim 49, wherein the processor is further configured to determine to evaluate received data signals according to timing of at least one data format, if a data signal has been received.

* * * * *